No. 707,123. Patented Aug. 19, 1902.
E. B. LACEY & A. J. FULLER.
SILO.
(Application filed May 15, 1902.)
(No Model.)
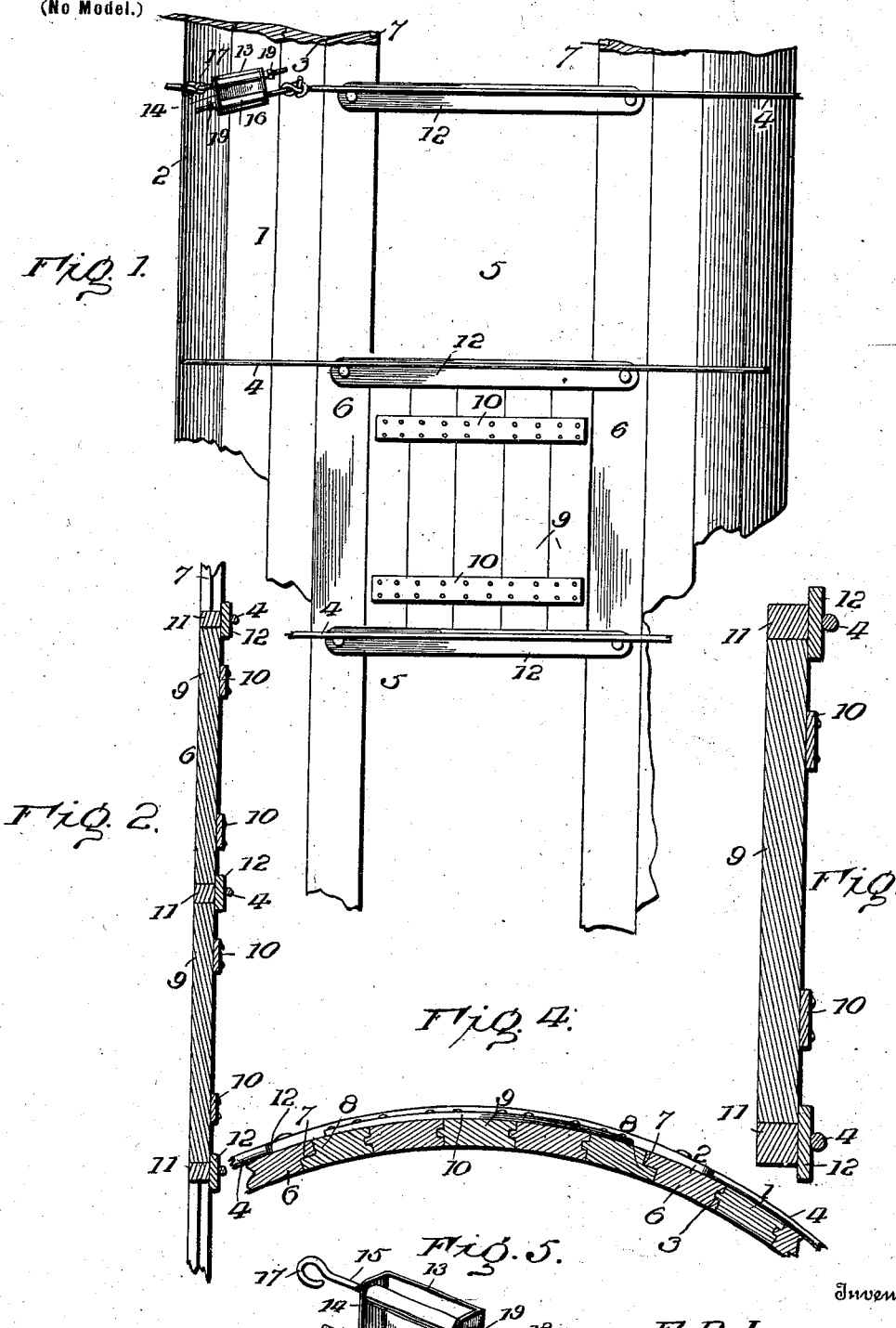
Witnesses
Gladys L. Thompson
Inventors
E. B. Lacey
A. J. Fuller
Attorneys

United States Patent Office.

ELMER B. LACEY AND ARTHUR J. FULLER, OF WEST AUBURN, PENNSYLVANIA.

SILO.

SPECIFICATION forming part of Letters Patent No. 707,123, dated August 19, 1902.

Application filed May 15, 1902. Serial No. 107,505. (No model.)

*To all whom it may concern:*

Be it known that we, ELMER B. LACEY and ARTHUR J. FULLER, citizens of the United States, residing at West Auburn, in the county of Susquehanna and State of Pennsylvania, have invented certain new and useful Improvements in Silos; and we do hereby declare the following to be a full, clear, and exact description of the invention, such as will enable others skilled in the art to which it appertains to make and use the same.

This invention relates to silos, and refers to the construction of silos themselves, and particularly to the construction and arrangement of the doors, whereby access may be gained to the interior of the silo. The silo in its construction embodies, in connection with a series of vertical staves, binding cables or hoops which securely hold the structure together and brace the same at all points, and the door which is set flush with the walls of the silo and which is composed of a plurality of sections separately and independently insertible and removable, so as to form when removed a practically open and continuous door or entrance extending from the bottom to the top of the silo.

With the above and other objects in view the invention consists in the novel construction, combination, and arrangement of parts, as hereinafter fully described, illustrated, and claimed.

In the accompanying drawings, Figure 1 is a front elevation of a sufficient portion of a silo to illustrate the present improvements, showing one of the door-sections in place and the remaining sections omitted. Fig. 2 is a vertical section taken through the door. Fig. 3 is an enlarged detail vertical section through one of the door-sections, also showing the division-strips or door-seats, the keeper-strips, and hoops. Fig. 4 is a horizontal section taken on the line $y$ $y$ of Fig. 1. Fig 5 is an enlarged detail perspective view of the band stretcher or taker.

Like reference-numerals designate corresponding parts in all figures of the drawings.

The body or frame of the silo (indicated at 1) is composed of a series of vertically-extending staves 2, which are connected by tongue-and-groove joints, as at 3, to secure a close air-tight fit. The staves composing the silo are securely held together and braced by means of a series of horizontally-extending hoops 4, which pass entirely around the silo and have their ends suitably connected, said hoops being preferably composed of galvanized wire or wire cable.

At a suitable point enough staves are omitted to provide a doorway or opening 5, extending any suitable height and preferably from the top to the bottom of the silo, the door-jambs 6 consisting of staves similar to the other staves composing the silo, with the exception that the stave-jambs 6 are rabbeted, as shown at 7, to receive the door-sections 8, the opposite edges of which are correspondingly rabbeted to fit the jamb and lie flush with the inner and outer surfaces of the walls of the silo, as shown in Fig. 4. Each of the door-sections is composed of a series of vertically-extending staves 9, fitted together by tongue-and-groove joints and braced and held by means of curved cleats 10, the curvature of which corresponds with that of the silo-walls. In line with each hoop 4 there is arranged a division-strip 11, extending horizontally, of equal thickness with the staves 2 and curved to conform to the curvature of the silo-walls. Each division-strip has its outer surface flush with the outer surface of the silo and is covered by a keeper-strip 12 of greater width than the division-strip, so as to extend above and beneath the same, as best shown in Fig. 3, for the purpose of engaging the adjacent edges of the outer sections and preventing the same from being forced outward by the ensilage or other material in the silo. The ends of the keeper-strips extend beyond the adjacent inner edges of the stave-jambs 6 and are bolted or otherwise firmly secured to said jambs, as shown. The keeper-strips are preferably composed of hard wood, although they may be composed of galvanized iron or other material.

From the foregoing description it will be seen that the door-sections are capable of being separately and independently removed and replaced without disturbing the remaining sections, thus greatly facilitating the filling and emptying of the silo; also, that the door-sections are held in place by the pressure of the ensilage and without the aid of bolts, screws, or other fastenings. A continuous open front is thus provided which facilitates access to the silo. The division-strips 11 form seats for the door-sections and also serve to brace the structure where it is weakened by the formation of the doorway. The galvanized hoops form a thorough brace for the structure as a whole, and suitable provision may be made for taking up slack in said hoops. It will further be seen that the door-sections, as well as the division strips or seats, conform to the curvature of the silo-walls, and thus provide perfectly smooth and flush inner surfaces throughout the silo when the doors are placed in position.

In order to provide for taking up slack in the bands or hoops 4, we employ a wrought-iron plate or lug 13, having the end portions thereof bent to form flanges 14, with openings to receive parallel eyebolts 15, the said bolts also passing through a pair of sleeves 16, interposed between the flanges, so as to hold the flanges at the proper distance apart and prevent the same from bending inward. The bolts 15 are extended in opposite directions and are provided with terminal eyes 17 at one end, the opposite end of each bolt being threaded, as at 18, to receive an adjusting-nut 19. The ends of the band or hoop 4 are tied or otherwise connected to the eyes 17 and the nuts 19 tightened until all slack has been taken up in said bands or hoops. In case the bands stretch too far the eyebolts may be moved back and the bands again connected therewith after cutting off a portion thereof. In this way ample provision is made for adjusting the length of each band or hoop and taking up all slack therein.

Having thus described the invention, what we claim as new, and desire to secure by Letters Patent, is—

A silo provided with a doorway and with jambs rabbeted to receive the door, in combination with a door consisting of a series of sections, division-strips extending horizontally across the door-opening and curved to conform to the curvature of the silo-walls, keeper-strips of greater width than the division-strips having their ends bolted to the door-jambs, and extending along the outer surface of the division-strips, and a series of door-sections curved to conform to the curvature of the silo-walls and adapted to fit flush between the door-jambs and division-strips, the said door-sections being separately and independently removable and adapted to be held in place by internal pressure, substantially as described.

In testimony whereof we affix our signatures in presence of two witnesses.

ELMER B. LACEY. [L. S.]
ARTHUR J. FULLER. [L. S.]

Witnesses:
SOLLIS LA FRANCE,
A. F. LACEY.